(12) United States Patent
Nigam et al.

(10) Patent No.: US 9,504,071 B2
(45) Date of Patent: Nov. 22, 2016

(54) SYSTEM AND METHODS FOR ADDRESSING MOBILE STATION IN WIRELESS COMMUNICATION SYSTEM

(71) Applicant: Samsung Electronics Co., Ltd, Gyeonggi-do (KR)

(72) Inventors: Anshuman Nigam, Bangalore (IN); Anil Agiwal, Bangalore (IN); Diwakar Sharma, Bangalore (IN); Young-Bin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 13/887,085

(22) Filed: May 3, 2013

(65) Prior Publication Data

US 2013/0295945 A1    Nov. 7, 2013

(30) Foreign Application Priority Data

May 4, 2012   (IN) ............................ 1747/CHE/2012

(51) Int. Cl.
| | |
|---|---|
| H04L 12/28 | (2006.01) |
| H04W 76/02 | (2009.01) |
| H04W 8/26 | (2009.01) |
| H04L 29/12 | (2006.01) |
| H04W 28/06 | (2009.01) |

(52) U.S. Cl.
CPC ........ *H04W 76/021* (2013.01); *H04L 61/2046* (2013.01); *H04L 61/6004* (2013.01); *H04L 61/6022* (2013.01); *H04L 61/6072* (2013.01); *H04W 8/26* (2013.01); *H04W 28/06* (2013.01)

(58) Field of Classification Search
CPC .... H04W 8/26; H04W 76/021; H04W 28/06

USPC ................ 340/3.54, 7.43, 7.45, 9.1–9.17; 370/312, 349, 392, 393, 474
See application file for complete search history.

(56) References Cited

U.S. PATENT DOCUMENTS

| | | | |
|---|---|---|---|
| 6,300,864 B1* | 10/2001 | Willey .................... 340/7.43 |
| 2005/0037778 A1* | 2/2005 | Patel ...................... 455/456.3 |
| 2009/0311997 A1 | 12/2009 | Fried et al. | |
| 2010/0008327 A1 | 1/2010 | Son et al. | |
| 2011/0038312 A1 | 2/2011 | Wang et al. | |
| 2011/0044444 A1 | 2/2011 | Abramson | |
| 2011/0149864 A1 | 6/2011 | Lazaridis et al. | |
| 2013/0215840 A1* | 8/2013 | Lim et al. ................. 370/329 |

OTHER PUBLICATIONS

International Search Report dated Aug. 23, 2013 in connection with International Patent Application No. PCT/KR2013/003867, 5 pages.

* cited by examiner

*Primary Examiner* — Charles Appiah
*Assistant Examiner* — Jaime Holliday

(57) ABSTRACT

In wireless communication system each MS is assigned a globally unique address. The method and system use one of these globally unique addresses to identify the MS. The efficient method of signaling this large size MS address (MS ID) is proposed. The 'n' bit MS ID is divided into 'p' parts wherein 'p' is greater than 1. The MS is addressed or identified using 'x' parts from a set of 'p' parts of MS ID, wherein 'x'<='p'. Further, methods to determine and signal the number of parts i.e. value of 'x' and which 'x' parts out of 'p' parts to be used for addressing is also proposed. The decision to determine the number of parts i.e. value of 'x' and which 'x' parts out of 'p' parts to be used for addressing the MS may be static, semi static or dynamic.

28 Claims, 21 Drawing Sheets

SYSTEM AND METHODS FOR ADDRESSING MOBILE STATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of an Indian patent application Serial No. 1747/CHE/2012 filed on May 4, 2012 in the Indian Intellectual Property Office, the entire disclosure of which is hereby incorporated by reference.

TECHNICAL FIELD

The present disclosure relates to the field of mobile communication and more particularly to system and methods for addressing mobile stations in a wireless communication network.

BACKGROUND

In the recent years, several broadband wireless technologies have been developed to meet the growing number of broadband subscribers and to provide more and better applications and services. The 3rd Generation Partnership Project 2 (3GPP2) developed Code Division Multiple Access 2000 (CDMA 2000), 1× Evolution Data Optimized (1×EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. The Institute of Electrical and Electronics Engineers (IEEE) developed Mobile Worldwide Interoperability for Microwave Access (WiMAX) systems. As more and more people become users of mobile communication systems and more and more services are provided over these systems, there is an increasing need for mobile communication systems with large capacity, high throughput, lower latency and better reliability.

Millimeter-Wave Mobile Broadband (MMB) system based on millimeter waves i.e. radio waves with wavelength in range of 1 millimeter (mm) to 10 mm, which corresponds to a radio frequency of 30 Gigahertz (GHz) to 300 GHz, is a candidate for next generation mobile communication technology as vast amount of spectrum is available in millimeter wave band. An MMB network consists of multiple MMB base stations (BSs) that cover a geographic area. In order to ensure good coverage, MMB base stations need to be deployed with higher density than macro-cellular base stations. In general, roughly the same site-to-site distance as microcell or pico-cell deployment in an urban environment is recommended for the MMB base stations. The transmission and/or reception in an MMB system are based on narrow beams, which suppress the interference from neighboring MMB base stations and extend the range of an MMB link. This allows significant overlap of coverage among neighboring base stations. Unlike cellular systems that partition the geographic area into cells with each cell served by one or a few base stations, the MMB base stations form a grid with a large number of nodes to which an MMB mobile station (MS) can communicate. The MMB base station grid eliminates the problem of poor link quality at the cell edge that is inherent in cellular system and enables high-quality equal grade of service (EGOS) regardless of the location of a mobile.

In order to utilize the fact that MS can detect signal from multiple BSs in MMB network, a virtual cell (or the cloud cell) is formed around the MS. A cloud cell is a virtual cell consisting of multiple BSs that serve a MS. The BSs in a cloud cell communicating with the MSs need to perform downlink (DL) Tx Beamforming, while the MSs may need to perform DL Rx Beamforming to receive DL control and data. An MS communicating with a BS in the cloud cell may need to perform uplink (UL) Tx Beamforming while the BS will perform UL Rx Beamforming to transmit UL data.

In order for MS to communicate with base stations in cloud cell an address is needed to identify the MS. For example, address is needed for Unicast resource allocation signaling transmission by BS such as Downlink and Uplink MAP wherein the address indicates to MS whether the resource allocation is for it or some other mobile station, Bandwidth Request transmission by MS wherein the address indicates to BS the identity of the MS which has transmitted the bandwidth request and for scrambling the physical layer protocol data units.

In one of the existing methods each BS maintains an independent address space and MS is assigned an address which is not used by any BS in cloud cell (CC). In this method, the cloud cell master coordinates with BSs in cloud cell to determine the address to be assigned to the MS. MS uses the assigned address to communicate with any BS in CC. This method requires coordination amongst the BSs in cloud cell. It also results in address update whenever the cloud cell is updated.

In another existing method, in order to reduce the coordination amongst the BSs in cloud cell disjoint sets of addresses are maintained by each BS. This requires careful planning so that BSs in cloud cell do not have overlapping address sets.

In another existing method, MS is assigned multiple addresses in cloud cell, one by each BS. MS uses the address specific to the BS while communicating with a BS in CC. This method requires MS to handle multiple addresses and hence results in increased complexity.

In the existing wireless communication systems wherein MS communicates with one BS, it is assigned different logical addresses to be used in different states and needs to be updated whenever the domain in which the address was assigned is crossed because of MS mobility.

Due to aforementioned reasons, it is evident that existing methods are not efficient in addressing MS's in such a cloud cell environment. Further, an efficient method of addressing the MS which reduces the air interface overhead along with reduced planning, BS coordination and complexity in wireless communication system is needed.

SUMMARY

To address the above-discussed deficiencies of the prior art, it is a primary object to provide to provide a method and system to use one of the globally unique addresses to identify the MS among the plurality of mobile stations.

Another object of the disclosure is to provide a method and system to address the MS with reduced signaling overhead along with reduced planning.

Accordingly the disclosure provides a method for addressing a mobile station in a communication network by employing a unique Mobile Station Identification (MS ID) for the mobile station, the network comprising a plurality of mobile stations and at least one base station, further the method comprising partitioning the MS ID of each mobile station into plurality of parts by the base station, determining at least one part out of a plurality of parts of the MS ID to be employed for uniquely addressing the mobile station by the base station, indicating to the mobile station of the at least one part out of the plurality of parts of MS ID employed for addressing the mobile station by the base station, and addressing the mobile station by employing the at least one part out of a plurality of determined parts of the MS ID.

Accordingly the disclosure provides a base station for addressing a mobile station in a communication network by employing a unique Mobile Station Identification (MS ID), the base station is configured to partition the MS ID of the mobile station into plurality of parts, determine at least one part out of a plurality of parts of the MS ID to be employed for uniquely addressing the mobile station, indicating to the mobile station of the at least one of determined parts of MS ID employed for addressing the mobile station, and addressing the mobile station by employing the at least one out of the plurality of parts of the MS ID.

Accordingly the disclosure provides a mobile station employing a unique Mobile Station Identification (MS ID) in a communication network for addressing the mobile station, wherein the mobile station is configured to receive an indication in a control information message of the parts used for addressing the mobile station from a base station, and decode the control information message for determining which parts of the MS ID are employed for addressing the mobile station.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
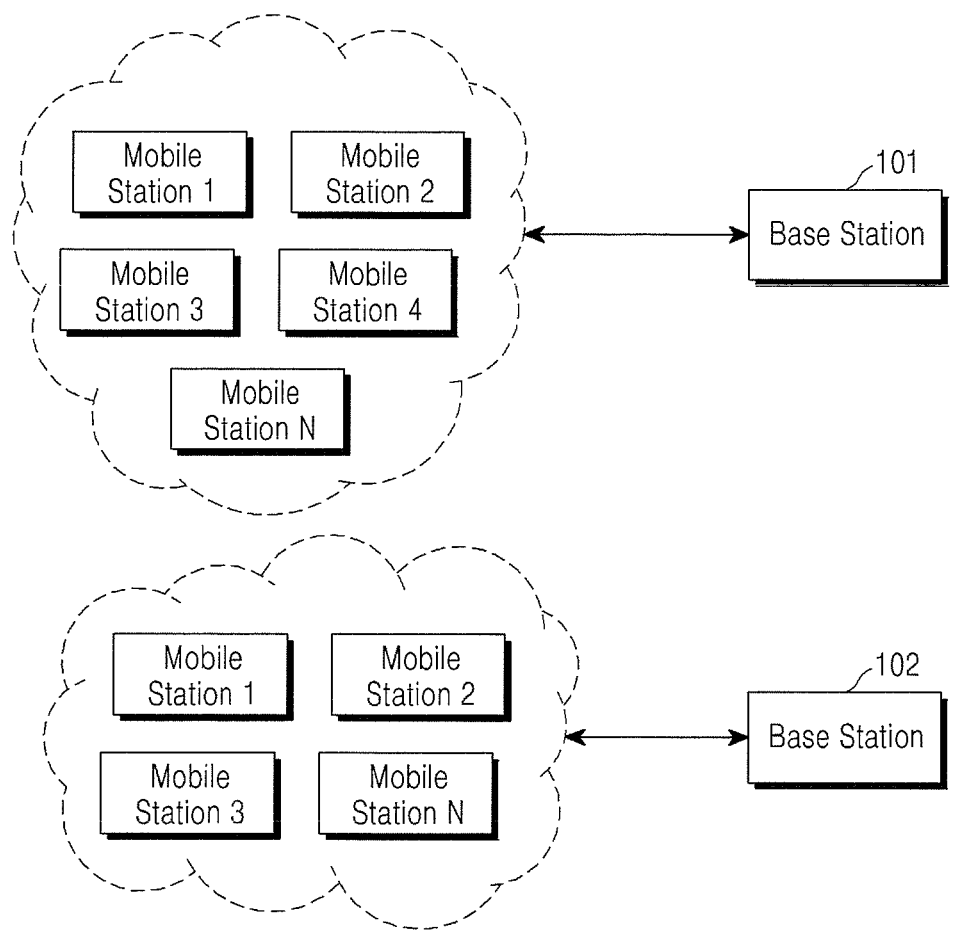
FIG. 1 illustrates an exemplary diagram of communication network, according to embodiments as disclosed herein.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for the Base Station (BS) to address the Mobile Station (MS) among the plurality of mobile stations (MSs) using the MS ID which is unique across the MSs in wireless communication system. Selectively, the MS ID may be a subscription station (SS) Medium Access Control (MAC) ID. The proposed method and system uses one of these globally unique addresses to identify the MS. The globally unique address is large in size and leads to significant signaling overhead on the communication channel between the MS and the BS. The method and system of the present disclosure provides mechanisms to use the globally unique address with reduced signaling overhead.

Referring now to the drawings, and more particularly to FIGS. 1 through 22, where similar reference characters denote corresponding features consistently throughout the figures, there are shown preferred embodiments.

FIG. 1 illustrates an exemplary diagram of communication network, according to embodiments as disclosed herein. As depicted in the figure, plurality of mobile stations (MS) are connected to the base station (BS) 101 and 102 respectively. A cloud cell (CC) is formed around the MS in order for the MS to detect the signal from multiple BS in the MMB network. A cloud cell is a virtual cell consisting of plurality of BSs that serves a MS. The BSs in the cloud cell communicating with plurality of MS need to perform downlink (DL) Tx Beamforming and uplink (UL) Rx Beamforming to transmit and receive data from the MS. Similarly, the MS needs to perform DL Rx Beamforming to receive DL control and data. MS also performs UL Tx Beamforming to transmit the UL data.

Figure 2:
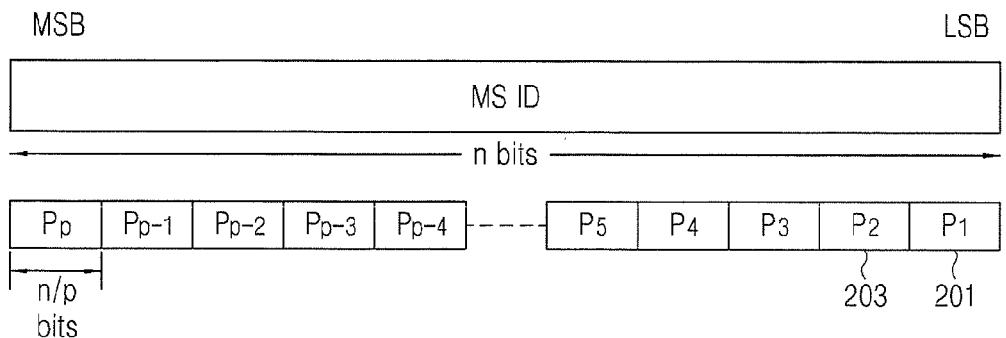
FIG. 2 illustrates the MS ID parts, according to embodiments as disclosed herein.

FIG. 2 illustrates the MS ID parts, according to embodiments as disclosed herein. The method and system of the present disclosure provides an efficient method of signaling the large size MS address (MS ID). The 'n' bit MS ID is divided into 'p' integral parts wherein 'p' is greater than 1. All the 'p' parts are equal in size. Part '1' 201 consists of 'n/p' least significant bits (LSB) of MS ID. Part '2' 203 consists of 'n/p' subsequent least significant bits of MS ID and so on. The parts may also be numbered starting from most significant bits (MSB). In an alternate embodiment, the 'p' parts of 'n' bit MS ID may be of different sizes. Some parts may be of same size and others may be of different sizes. The number of parts in which MS ID is divided may be different for addressing an MS in idle mode and connected mode. The number of parts may be decided based on available bandwidth for transmitting the address.

Figure 3:
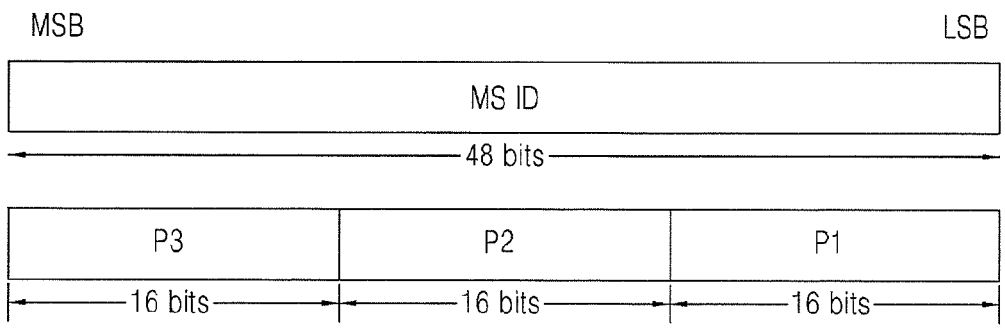
FIG. 3 illustrates the MS ID parts to address the MS, according to embodiments as disclosed herein.

FIG. 3 illustrates the MS ID parts to address the MS, according to embodiments as disclosed herein. As depicted in the figure, the MS is addressed or identified using 'x' parts from a set of 'p' parts of MS ID, wherein 'x'<='p'. This reduces the signaling overhead. The BS or network entity needs to determine the number of parts i.e. value of 'x' and which 'x' parts out of 'p' parts are to be used for addressing the MS. For example, for a 48 bit MS ID which is divided into 3 parts (P1, P2 and P3) each of 16 bits, the BS or network entity needs to determine if it will use P1, or P2 or P3 or P1P2 or P2P3 or P3P1 or P1P2P3 to address the MS.

Figure 4:
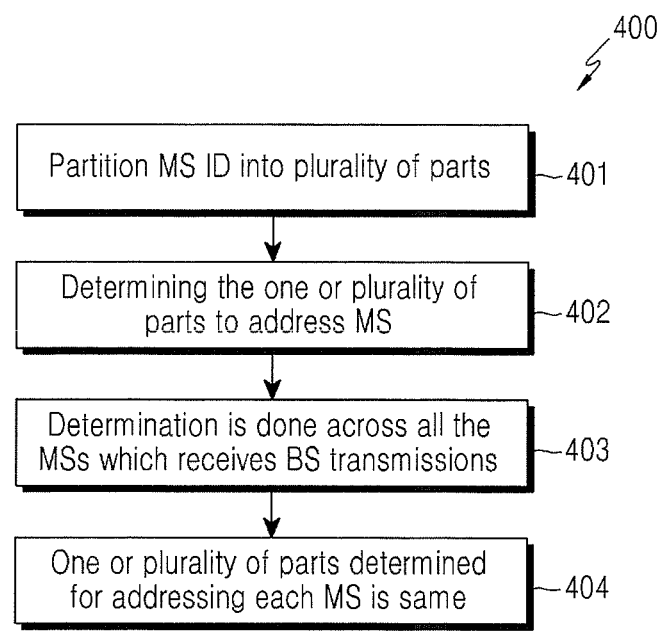
FIG. 4 illustrates the flow chart that describes the process of MS addressing, according to embodiments as disclosed herein.

FIG. 4 illustrates the flow chart that describes the process of MS addressing, according to embodiments as disclosed herein. As depicted in the FIG. 400, the base station partitions (401) the MS ID into plurality of parts. Then the base station determines (402) the one or a plurality of parts which needs to be used to address the MS. The base station determines one or a plurality of parts which needs to be used to address the MS by comparing the MS ID parts across the MS IDs of MSs (403) which receive BS transmissions and which use the address to identify the unicast transmissions. The determined one or a plurality of parts used for addressing (404) each MS is same. The value of parts is specific to the MS ID of the MS being addressed. The various actions in method 400 can be performed in the order presented, in a different order or simultaneously. Further, in some embodiments, some actions (e.g., 403, 404) listed in FIG. 4 can be omitted.

In one embodiment, the BS or network entity determines the value of 'x' and which 'x' parts out of 'p' parts such that the chosen 'x' parts are distinct across all the MSs which receive the BS transmissions and which use the address to identify the unicast transmissions in the transmission interval. The BS or network uses the same value of 'x' and same 'x' parts out of 'p' to address each MS. The value of 'x' parts is specific to MSID of each MS. For example, if it is determined that across all MSs 2 parts i.e. combination of part 1 and part 3 is distinct then BS or network uses part 1 and part 3 to address an MS wherein part 1 and part 3 value is specific to MS ID of MS being addressed. This is useful in scenario when new MSs are not getting added frequently to the BS or network as the value of 'x' and the determined 'x' parts out of 'p' remains unchanged until new MSs are added to the BS or network.

Figure 5:
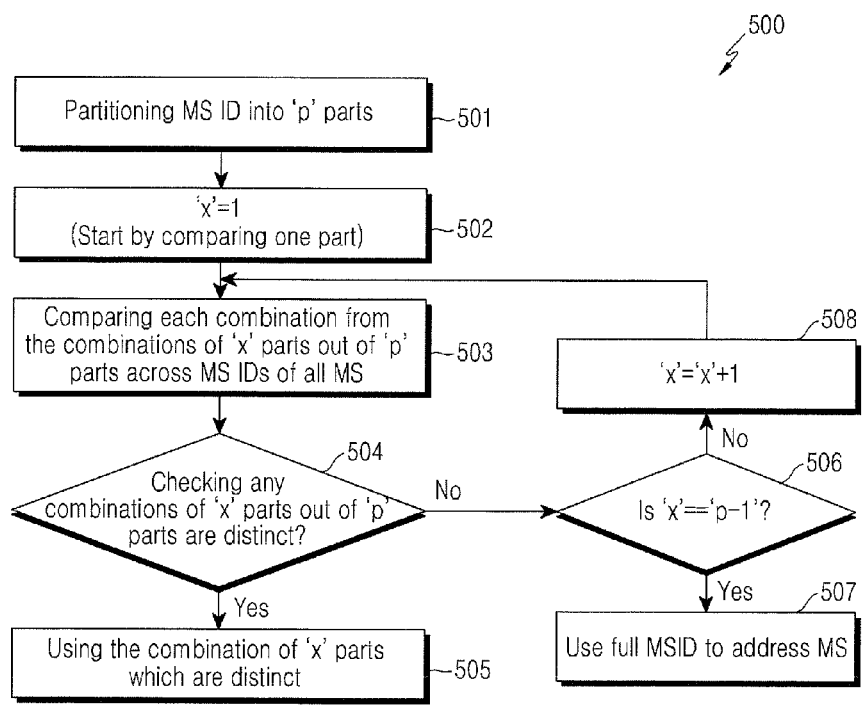
FIG. 5 illustrates the flow chart to determine the MS ID parts to be used to address the MS, according to embodiments as disclosed herein.

FIG. 5 illustrates the flow chart to determine the MS ID parts to be used to address the MS, according to embodiments as disclosed herein. As depicted in the FIG. 500, the base station first partitions (501) the MS ID in to 'p' parts. Then the BS starts (502) comparing one part (i.e. 'x'=1) and compares (503) if any one (i.e. 'x'=1) of 'p' parts is distinct across the MS IDs of all MSs (which receives the BS transmission and which use the address to identify the unicast transmissions in the transmission interval). Further, the base station checks (504) any combination of 'x' parts out of 'p' parts is distinct across the MS IDs of all the MS. If the BS finds that the combination of 'x' parts out of 'p' parts is distinct then, it uses (505) the combination of 'x' parts which are distinct across the MS IDs of the MSs to address MS. The various actions in method 500 can be performed in the order presented, in a different order or simultaneously. Further, in some embodiments, some actions listed in FIG. 5 can be omitted.

In one embodiment, the BS can first take part '1' and compares the part '1' of all the MS IDs. If part '1' is distinct across all the MS IDs then use only part '1' to address the MSs. If part '1' is not distinct across all the MSIDs then take part '2' and compares the part '2' of all the MS IDs. If part '2' is distinct across all the MS IDs then use only part '2' to address the MSs. If part '2' is not distinct across all the MS IDs then take the next part and compare that part of all the MS IDs. This process is repeated until a part is found which is distinct across all the MS IDs or a part which is distinct across all the MS IDs is not found after checking all the parts.

If any one of 'p' parts is not found to be distinct across the MS IDs of all MSs, then the BS or network entity determines if any combination of two (i.e. 'x'=2) parts of 'p' parts is distinct across the MS IDs of all MSs. If any combination of two parts out of 'p' parts is not found to be distinct across the MS IDs of all MSs, then the BS determines ines if any combination of three ('x'=3) parts out of 'p' parts (p>2) is distinct across the MS IDs of all MSs. This process is repeated until any combination of 'x' parts of 'p' parts (x<p) are found to be distinct or any combination of 'x' parts of 'p' parts are not found to be distinct after checking (506) 'x' equals 'p−1' parts. If any combination of 'p−1' (i.e. 'x'=p−1) parts of 'p' parts is not found to be distinct across the MS IDs of all MSs, then the BS or network entity uses (507) the full MS ID to address the MS. If BS found that the 'x' not equals 'p−1' parts then it increments (508) the value of x by 1 (i.e. x=x+1). BS determines the number of parts i.e. value of 'x' and which 'x' parts out of 'p' parts to be used for addressing the MS.

In one embodiment, while comparing the 'x' parts out of 'p' parts across the MS IDs, the number of MS IDs which are distinct across each combination of 'x' parts out of 'p' parts can be saved. This information can be used if any combination of 'p−1' (i.e. 'x'=p−1) parts of 'p' parts is not found to be distinct across the MS IDs of all MSs to determine which combination of 'x' parts out of 'p' parts has least number of collisions and the same can be used instead of full MS ID.

In an alternate embodiment, a collision threshold 'T' can be defined and the combination of 'x' parts out of 'p' parts which has collision less than 'T' can be used instead of finding the combination which is distinct across all the MS IDs. The threshold T can be defined as a percentage of MSs required to be addressed in the concerned time interval.

Figure 6:
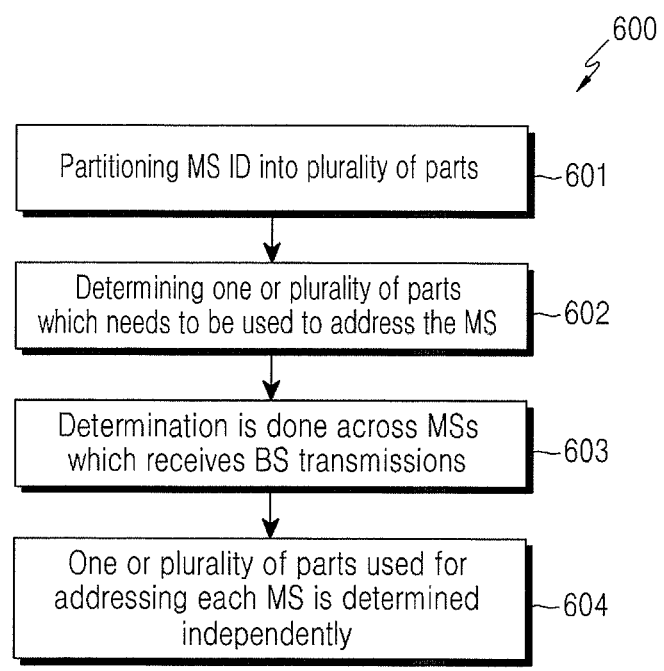
FIG. 6 illustrates the flow chart that describes an alternate process of MS addressing, according to embodiments as disclosed herein.

FIG. 6 illustrates the flow chart that describes an alternate process of MS addressing, according to embodiments as disclosed herein. As depicted in the FIG. 600, the base station partitions (601) the MS ID into plurality of parts. Then the base station determines (602) the one or a plurality of parts which needs to be used to address the MS. The base station determines one or a plurality of parts which needs to be used to address the MS by comparing (603) the MS ID parts across the MS IDs of MSs which receives BS transmission and which use the address to identify the unicast transmissions. The determined one or a plurality of parts used for addressing each MS is determined (604) independently. The parts used for one MS can be different from that of other. The various actions in method 600 can be performed in the order presented, in a different order or simultaneously. Further, in some embodiments, some actions (e.g., 603, 604) listed in FIG. 6 can be omitted.

In an embodiment, the BS or network entity determines which 'x' parts out of 'p' parts starting with 'x'=1 are to be used for addressing the MSs in unicast manner such that the value of 'x' and which 'x' parts out of 'p' parts to be used for each MS is determined independently. In this embodiment, value of 'x' and which 'x' parts out of 'p' parts is determined for each MS which receives the BS transmissions and which will use the address to identify the unicast transmissions in the transmission interval.

Figure 7:
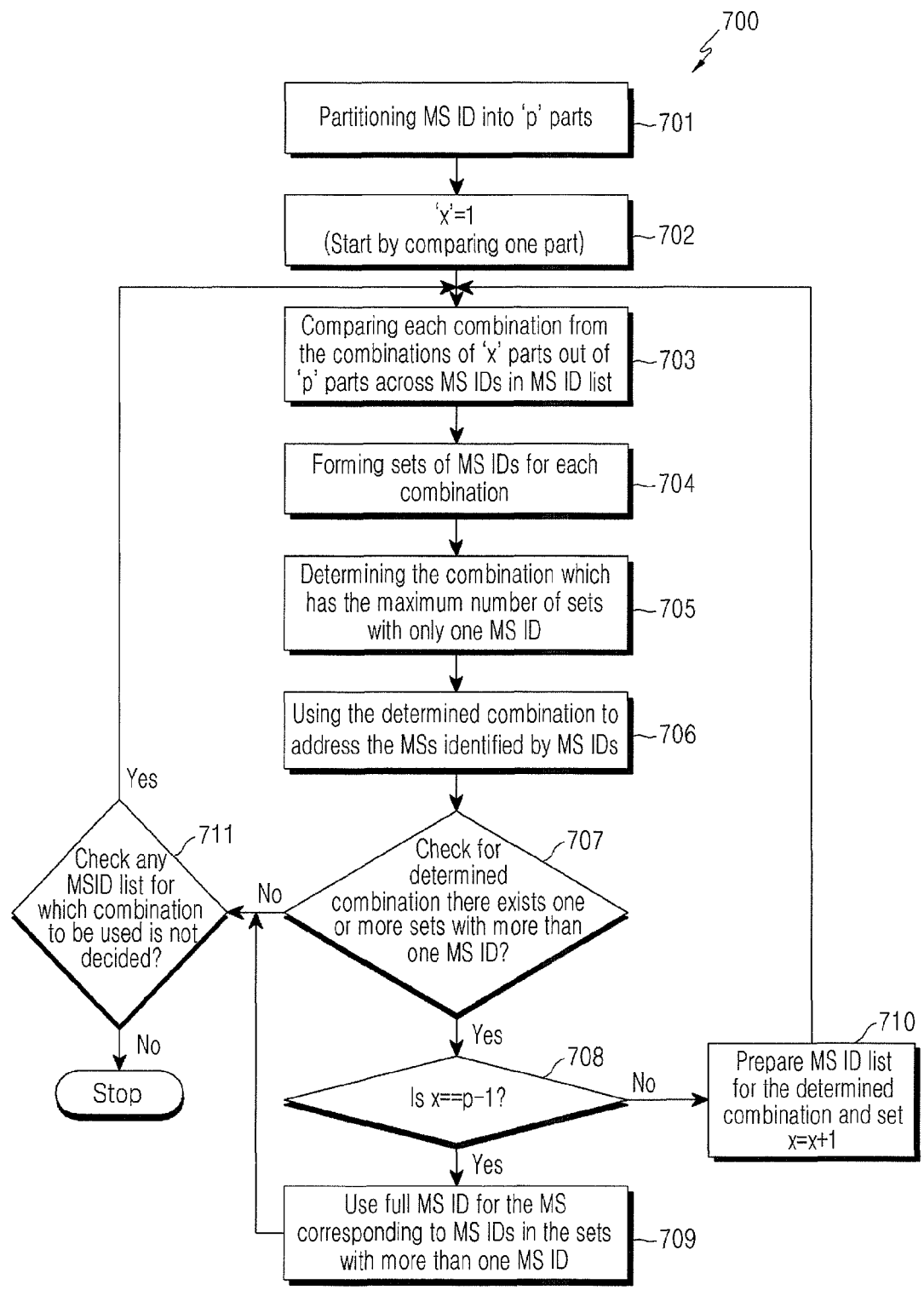
FIG. 7 illustrates the flow chart that describes alternate way to determine the MS ID parts to be used to address the MS, according to embodiments as disclosed herein.

FIG. 7 illustrates the flow chart that describes alternate way to determine the MS ID parts to be used to address the MS, according to embodiments as disclosed herein. As depicted in the FIG. 700, the base station partitions (701) the MS ID into 'p' parts. Then the BS determines (702) which 'x' parts out of 'p' parts starting with 'x'=1 are to be used for addressing the MSs. BS sets the MS ID List to MS IDS of all MSs which receive the BS transmissions and can use the address to identify the unicast transmissions in the transmission interval. Then the BS compares (703) each combination from the combinations of 'x' parts out of 'p' parts across MS IDs in the MS ID List. Further, for each comparison the base station forms (704) sets of MS IDs wherein set consists of MS IDs which have same value for this combination. Then, BS determines (705) the combination which has the maximum number of sets with only one MS ID. Then, BS uses (706) the determined combination to address the MSs identified by MS IDs in the sets with only one MS ID for this combination.

For the determined combination, the BS checks (707) if there exists one or more sets with more than one MS ID. Then, for the determined combination, the BS checks (708) if one or more sets with more than one MS ID and x==p−1 exists then use (709) full MS ID for the MS corresponding to MS IDs in the sets with more than one MS ID. If the base station finds that x!=p−1 then for each of the sets with more than one MS ID for the determined combination, prepares (710) MS ID list with list of MS IDs in set and it will set x=x+1 and process each of these MS ID lists starting with 'x', i.e. it can loop back to step 703. Further, the BS checks (711) if there exist any MS ID list for which combination to be used is decided then the process will loop back to step 703 otherwise, it will get terminated. The various actions in method 700 can be performed in the order presented, in a different order or simultaneously. Further, in some embodiments, some actions listed in FIG. 7 can be omitted.

In one embodiment, while comparing the 'x' parts out of 'p' parts across the MS IDs for a given MS, number of MSs with which each combination of 'x' parts out of 'p' parts is distinct can be saved. This information can be used if any combination of 'p−1' (i.e. 'x'=p−1) parts of 'p' parts is not found to be distinct for an MS across the MS IDs of all MSs to determine which combination of 'x' parts out of 'p' parts has least number of collisions and the same can be used instead of full MS ID.

In alternate embodiment, a collision threshold 'T' can be defined and the combination of 'x' parts out of 'p' parts which has collision less than 'T' can be used instead of finding the combination which is distinct across all the MS IDs. The threshold T can be defined as a percentage of MSs required to be addressed in the concerned time interval.

Figure 8:
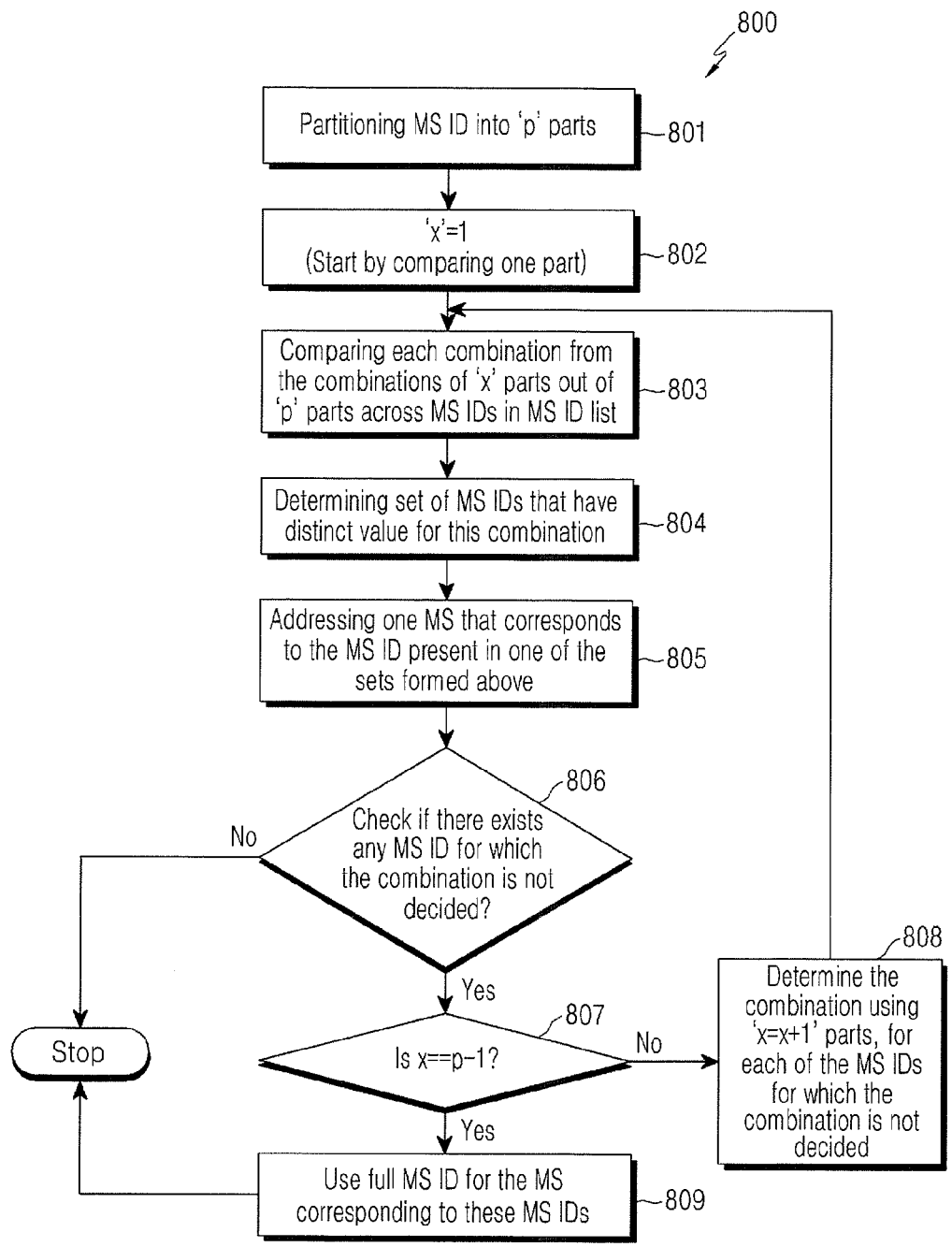
FIG. 8 illustrates the flow chart that determines another way to determine the MS ID parts to be used to address the MS, according to embodiments as disclosed herein.

FIG. 8 illustrates the flow chart that determines another way to determine the MS ID parts to be used to address the MS, according to embodiments as disclosed herein. As depicted in FIG. 800, the BS partitions (801) the MS ID into 'p' parts then BS or network determines (802) which 'x' parts out of 'p' parts starting with 'x'=1 are to be used for addressing the MSs. BS sets the MS ID list to MS IDs of all MSs which receive the BS transmissions and will use the address to identify the unicast transmissions in the transmission interval. Then, the BS compares (803) each combination from the combinations of 'x' parts out of 'p' parts across MS IDs in the MS ID list. Then, for each combination BS determines (804) set of MS IDs wherein set consists of MS IDs which have distinct (does not collide with other MS ID) value for this combination. An MS corresponding to the MS ID present in one of sets formed above is addressed (805) using the combination corresponding to that set. If the MS ID is present in multiple sets, one of the combinations corresponding to these sets is used to address the MS. Then, BS can check (806) if there exist any MS ID for which the combination is not decided and check (807) if x==p−1. If the BS finds (808) that x!=p−1 then for each of the MS IDs for which combination is not decided, decide the combination using 'x=x+1' parts and loop back to step 803. If the BS finds x==p−1 then it uses (809) full MS ID for the MS corresponding to these MS IDs and terminates the process. If there does exist any MS ID for which the combination is not decided then the process will get terminated. The various actions in method 800 can be performed in the order presented, in a different order or simultaneously. Further, in some embodiments, some actions listed in FIG. 8 can be omitted.

Figure 9:
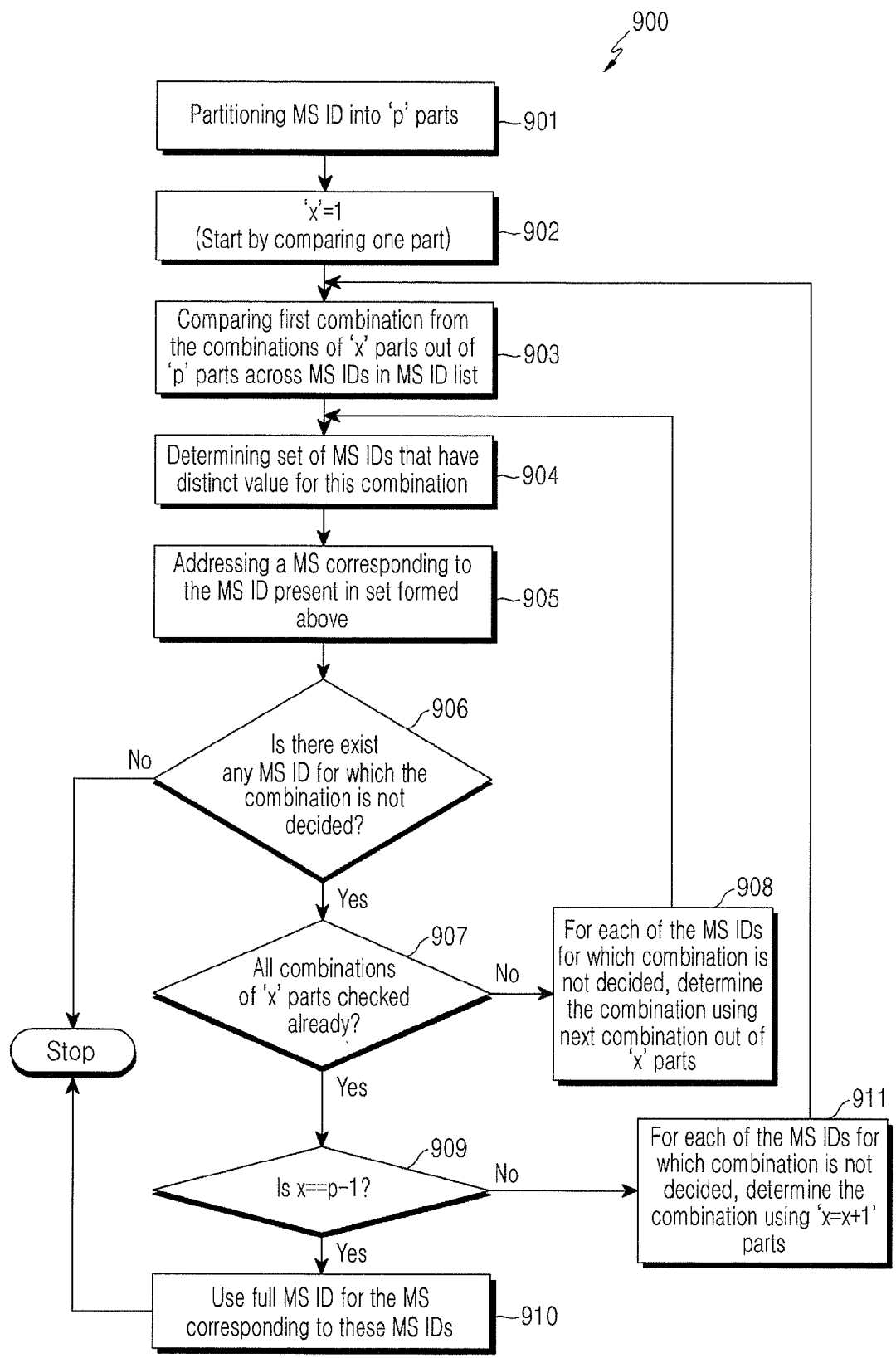
FIG. 9 illustrates the flow chart that describes a different variation to determine the MS ID parts to be used to address the MS, according to embodiments as disclosed herein.

FIG. 9 illustrates the flow chart that describes a different variation to determine the MS ID parts to be used to address the MS, according to embodiments as disclosed herein. As depicted in the FIG. 900, the BS partitions (901) the MS ID into 'p' parts. Then, BS or network determines (902) which 'x' parts out of 'p' parts starting with 'x'=1 are to be used for addressing the MSs. BS or network sets the MS ID list to MS IDs of all MSs which receive the BS transmissions and will use the address to identify the unicast transmissions in the transmission interval. Then, the BS compares (903) the first combination from the combinations of 'x' parts out of 'p' parts across MS IDs in the MS ID list. Then, for the combination the BS determines (904) set of MS IDs wherein set consists of MS IDs which have distinct (does not collide with other MS ID) value for this combination. An MS corresponding to the MS ID present in the set formed above is addressed (905) using the combination corresponding to this set. The BS checks (906) if there exist any MS ID for which the combination is not decided and also checks (907) all combination of 'x' parts are checked already. If it finds (908) all combination of 'x' parts are not checked, then for each of the MS IDs for which combination is not decided, determine the combination using the next combination of 'x' parts and loop back to step 904. Further, the BS checks if there exist any MS ID for which the combination is not decided and all combination of parts are checked and checks (909) x==p−1 then it uses (910) full MS ID for the MS corresponding to these MS IDs and get terminated. If the BS finds that x!=p−1 then for each of the MS IDs for which the combination is not decided, it determines (911) the combination using 'x==x+1' parts and loop back to step 903. If there does exist any MS ID for which the combination is not decided, then the process will get terminated. The various actions in method 900 can be performed in the order presented, in a different order or simultaneously. Further, in some embodiments, some actions listed in FIG. 9 can be omitted.

In one embodiment while comparing the 'x' parts out of 'p' parts across the MS IDs for a given MS, number of MSs with which each combination of parts out of 'p' parts is distinct can be saved. This information can be used if any combination of 'p−1' (i.e. 'x'=p−1) parts of 'p' parts is not found to be distinct for an MS across the MS IDs of all MSs to determine which combination of 'x' parts out of 'p' parts has least number of collisions and the same can be used instead of full MS ID.

In an alternate embodiment, a collision threshold 'T' can be defined and the combination of 'x' parts out of 'p' parts which has collision less than 'T' can be used instead of finding the combination which is distinct across all the MS IDs. The threshold T can be defined as a percentage of MSs required to be addressed in the concerned time interval.

Figure 10:
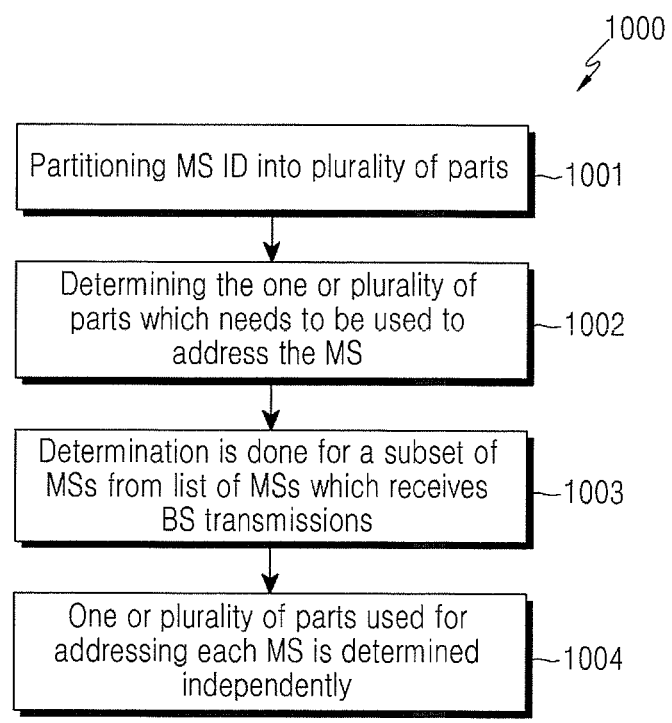
FIG. 10 illustrates the flow chart that describes different processes of MS addressing, according to embodiments as disclosed herein.

FIG. 10 illustrates the flow chart that describes different processes of MS addressing, according to embodiments as disclosed herein. As depicted in the FIG. 1000, the BS partitions MS ID into plurality of parts in step 1001. Then it determines the one or a plurality of parts which needs to be used to address the MS in step 1002. The determination is done for subset of MSs from the list of MSs which receive the BS transmissions and which will use the address to identify the unicast transmissions in the transmission interval in step 1003. One or a plurality of parts used for addressing each MS is determined independently at step 1004. The parts used for one MS can be different from that of other. The various actions in method 1000 can be performed in the order presented, in a different order or simultaneously. Further, in some embodiments, some actions (e.g., 1003, 1004) listed in FIG. 10 can be omitted.

Figure 11:
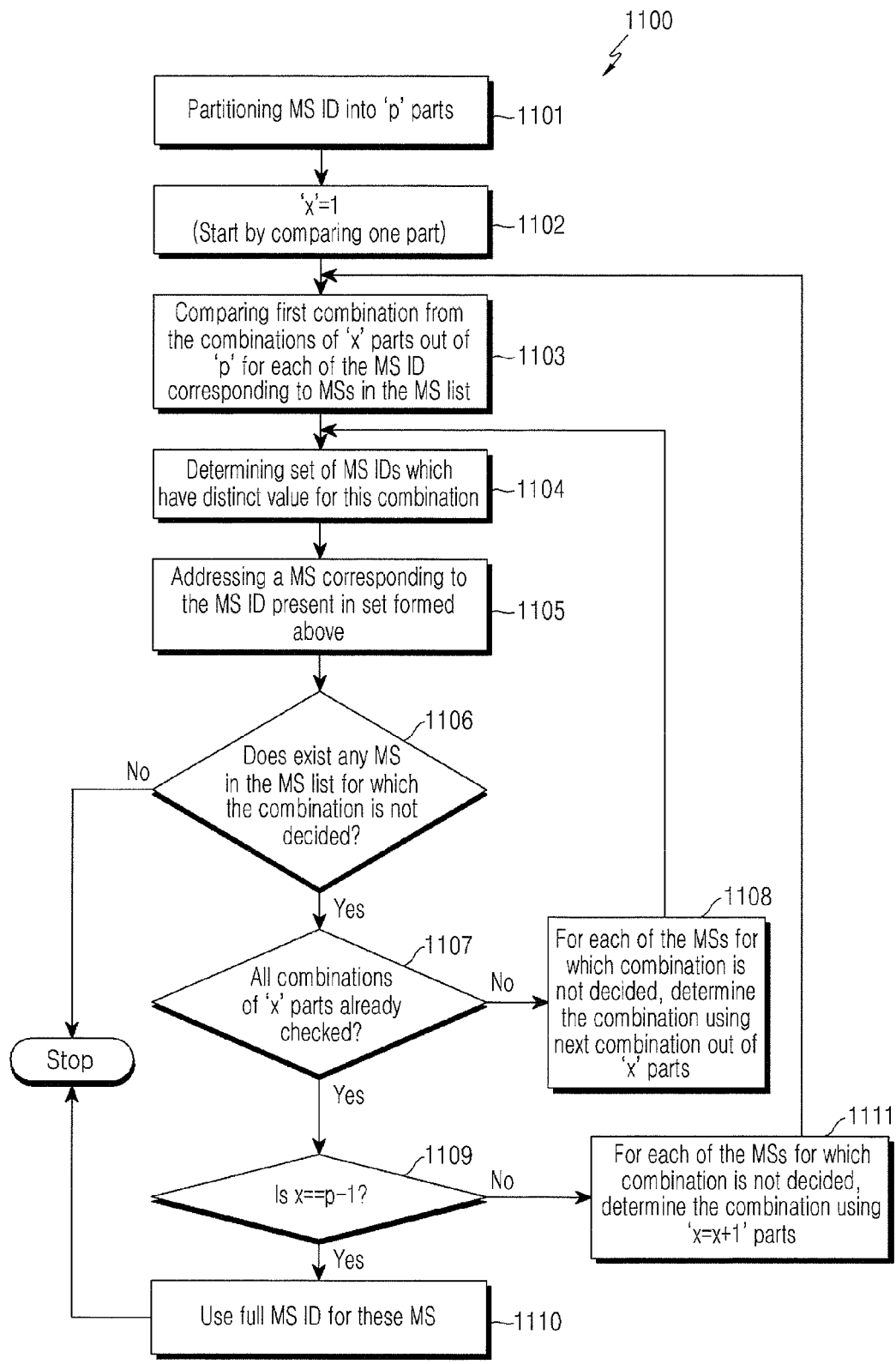
FIG. 11 illustrates the flow chart to that describes one way to determine the MS ID parts to be used to address the MS, according to embodiments as disclosed herein.

FIG. 11 illustrates the flow chart to that describes one way to determine the MS ID parts to be used to address the MS, according to embodiments as disclosed herein. As depicted in the FIG. 1100, the BS partitions MS ID into 'p' parts in step 1101. Then BS or network determines which 'x' parts out of 'p' parts starting with 'x'=1 are to be used for addressing the MSs in step 1102. Further, the BS or network sets the MS ID list to MS IDs of all MSs which receive the BS transmissions and will use the address to identify the unicast transmissions in the transmission interval. The MS list comprises the list of MSs for which parts of the MS ID for addressing is to be determined. Then, the BS compares the first combination from the combinations of 'x' parts out of 'p' parts for each of the MS ID corresponding to MSs in the MS list for which the combination is not determined yet, with all MS IDs in the MS ID list in step 1103. Then, for the combination the BS determines set of MS IDs (corresponding to MSs in the MS list for which the combination is not determined yet) wherein set consists of MS IDs which have distinct (does not collide with other MS IDs in the MS ID list) value for this combination in step 1104. An MS corresponding to the MS ID present in the set formed above is addressed using the combination corresponding to this set in step 1105. The BS checks if there exist any MS ID for which the combination is not decided in step 1106 and also checks all combination of 'x' parts are checked already in step 1107. In step 1108, if it finds all combination of 'x' parts are not checked, then for each of the MS IDs for which combination is not decided, determine the combination using the next combination of 'x' parts and loop back to step 1104. Further, the BS checks if there exist any MS ID for which the combination is not decided and all combination of 'x' parts are checked and the BS then checks if x==p−1 in step 1109 then, at step 1110, it uses full MS ID for the MS corresponding to these MS IDs and terminates the process If the BS finds that x!=p−1 then for each of the MS IDs for which the combination is not decided, it determines the combination using 'x=x+1' parts in step 1111 and loop back to step 1103. If there does exist any MS ID for which the combination is not decided, then the process will be terminated. The various actions in method 1100 can be performed in the order presented, in a different order or simultaneously. Further, in some embodiments, some actions listed in FIG. 11 can be omitted.

In one embodiment, while comparing the 'x' parts out of 'p' parts across the MS IDs for a given MS, number of MSs with which each combination of 'x' parts out of 'p' parts is distinct can be saved. This information can be used if any combination of 'p−1' (i.e. 'x'=p−1) parts of 'p' parts is not found to be distinct for an MS across the MS IDs of all MSs to determine which combination of 'x' parts out of 'p' parts has least number of collisions and the same can be used instead of full MS ID.

In alternate embodiment, a collision threshold 'T' can be defined and the combination of 'x' parts out of 'p' parts which has collision less than 'T' can be used instead of finding the combination which is distinct across all the MS IDs. The threshold T can be defined as a percentage of MSs required to be addressed in the concerned time interval.

Figure 12:
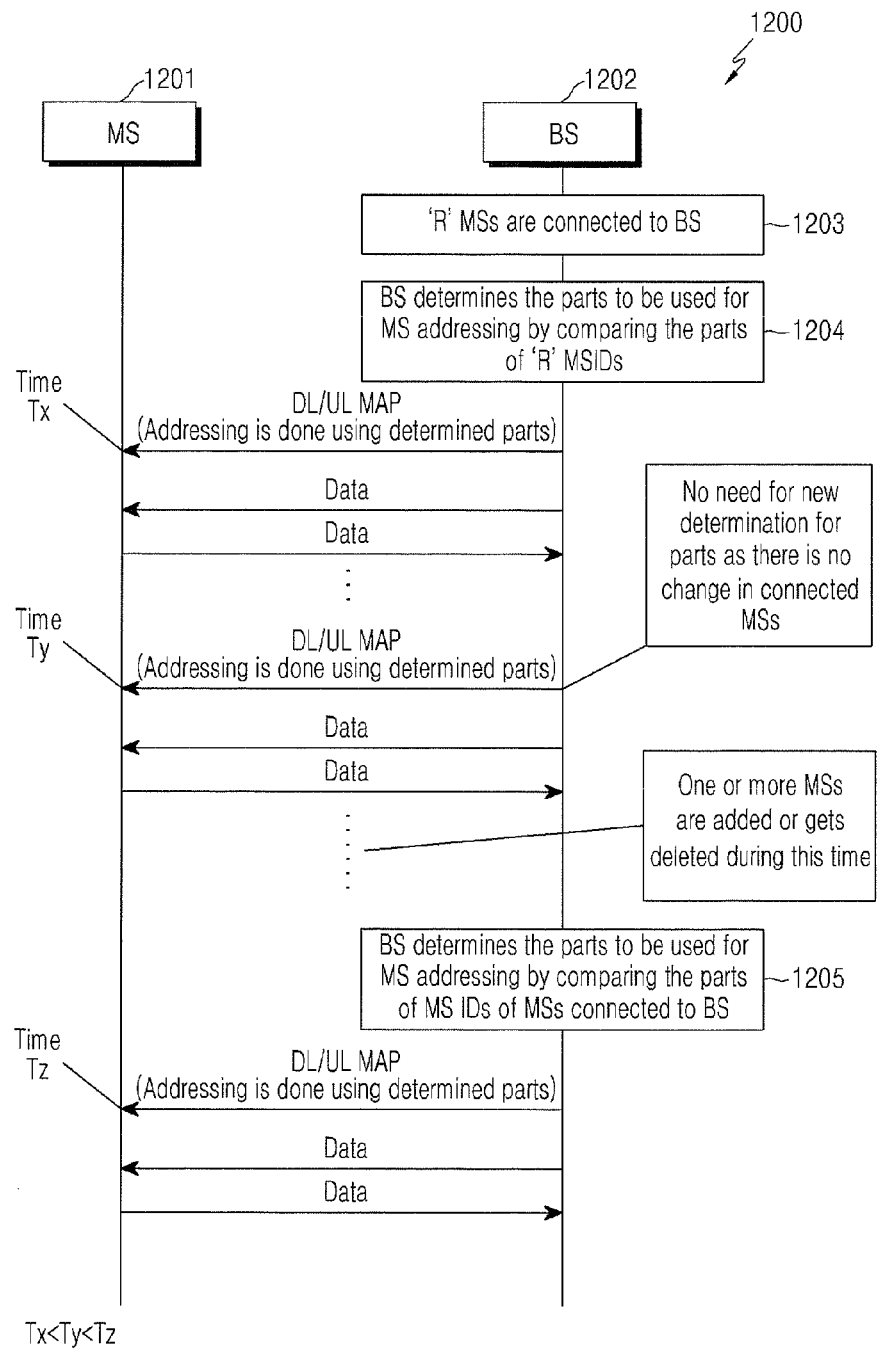
FIG. 12 illustrates the flow diagram describing the trigger to determine the MS ID parts to be used to address the MS, according to embodiments as disclosed herein.

FIG. 12 illustrates the flow diagram describing the trigger to determine the MS ID parts to be used to address the MS, according to embodiments as disclosed herein. As depicted in FIG. 1200, the mobile station (MS) 1201 and the BS 1202 are communicated. The BS 1202 identifies 'R' MSs connected 1203 to BS. Then BS 1202 determines 1204 the parts to be used for MS addressing by comparing the parts of 'R' MSIDs. The BS 1202 addresses the MS 1201 using determined parts. The DL and UL data are exchanged between MS 1201 and BS 1202. Then BS 1202 determines 1205 the parts to be used for MS addressing by comparing parts of MS IDs of MSs connected to BS. The decision to determine the number of parts i.e. value of 'x' and which 'x' parts out of 'p' parts to be used for addressing the MS 1201 can be static, semi static or dynamic. The various actions in method 1200 can be performed in the order presented, in a different order or simultaneously. Further, in some embodiments, some actions listed in FIG. 12 can be omitted.

In one embodiment, the BS can determine the number of parts i.e. value of 'x' and which 'x' parts out of 'p' parts are to be used for addressing the MS when it transmits control information or data to the MS. In one embodiment, the BS can skip this determination if there is no change in the list of MSs which receives the BS transmissions and which will use the address to identify the unicast transmissions.

In one embodiment, wherein value of 'x' and which 'x' parts out of 'p' parts are to be used for addressing the MS are determined in unicast manner, new determination is done for this MS only when the value of parts used for its addressing collides with those of a newly added MS.

In one embodiment, wherein a group of MSs are allocated certain time slots for receiving control or data information from the BS, the BS can determine the number of parts i.e. value of 'x' and which 'x' parts out of 'p' parts are to be used for addressing the MSs amongst the group of MSs allocated for the corresponding time slots.

Figure 13:
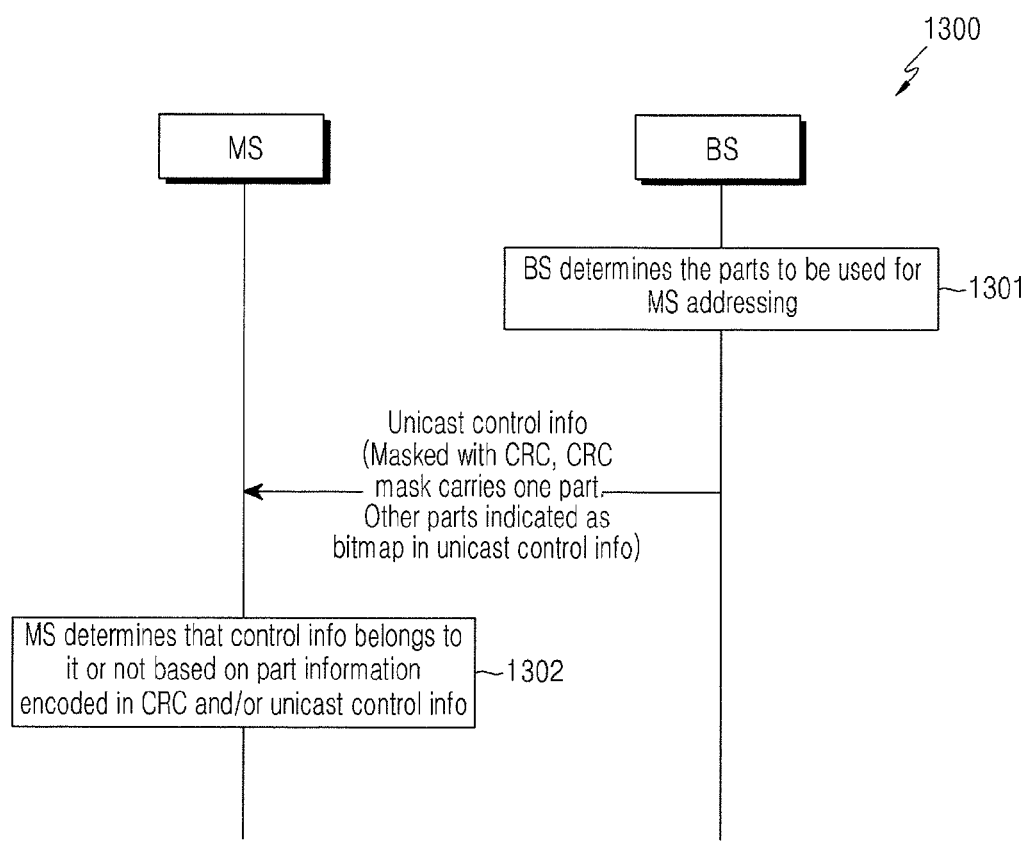
FIG. 13 illustrates the MS ID part(s) information used for addressing the MS is included in the control information, according to embodiments as disclosed herein.

FIG. 13 illustrates the MS ID part(s) information used for addressing the MS is included in the control information, according to embodiments as disclosed herein. In the proposed disclosure, the BS determines 1301 the number of parts i.e. value of 'x' and which 'x' parts out of 'p' parts are to be used for addressing the MS. In order to receive the unicast transmission MS needs to be aware of value of 'x' and which 'x' parts out of 'p' parts are used by the BS. MS also needs to be aware of value of 'p'. The value of 'p' can be predefined in the system.

In one embodiment, a bit map is transmitted to indicate the parts used by the BS to address the MS. The number of bits in the bitmap is equal to number of parts in which the MS ID is divided. Each bit corresponds to a part in the MS ID. In an alternate embodiment, the bit map is transmitted only if more than one part is used by the BS to address the MS, wherein the one part is known to the receiver.

In one embodiment, the value of 'x' and which 'x' parts out of 'p' parts are used by the BS can be broadcasted, if the value of 'x' and which 'x' parts out of 'p' parts used for each MS are same. In another embodiment, value of 'x' and which 'x' parts out of 'p' parts are used by the BS can be unicast to each MS if the value of 'x' and which 'x' parts out of 'p' parts used for each MS are determined independently.

In an alternate embodiment, of the disclosure wherein CRC (cyclic redundancy check) of control message is masked with MS address, one part out of 'x' parts used for MS address is used to generate the CRC mask and other parts if present, are included inside the control message. The information that which 'x' parts are used for MS address is present in control message in this embodiment. The presence of parts inside the control message can be indicated using the bitmap. The part identifier (; part ID) of the part used in CRC mask is also used to generate the CRC mask. The CRC mask consists of Part identifier and Part value. It can also consists of other fields or/and padding depending on the length of CRC mask. In an alternate embodiment, if the CRC length permits, multiple parts can also be used to generate CRC mask and bit map in CRC mask can indicate which part values are used to generate CRC mask.

In one embodiment, padding can consist of repeating the part value or it can be a predefined value. The one part (out of 'x' parts) used to generate the CRC mask can be chosen such that the collision of that part in MS IDs of all MSs is minimum compared to other parts in the 'x' parts. The FIG. 1300 illustrates the message sequence wherein MS ID part information is included in the control message in one embodiment of the disclosure. MS determines 1302 that control info belongs to it or not based on part information encoded in CRC and/or unicast control info. The various actions in method 1300 can be performed in the order presented, in a different order or simultaneously. Further, in some embodiments, some actions listed in FIG. 13 can be omitted.

Figure 14:
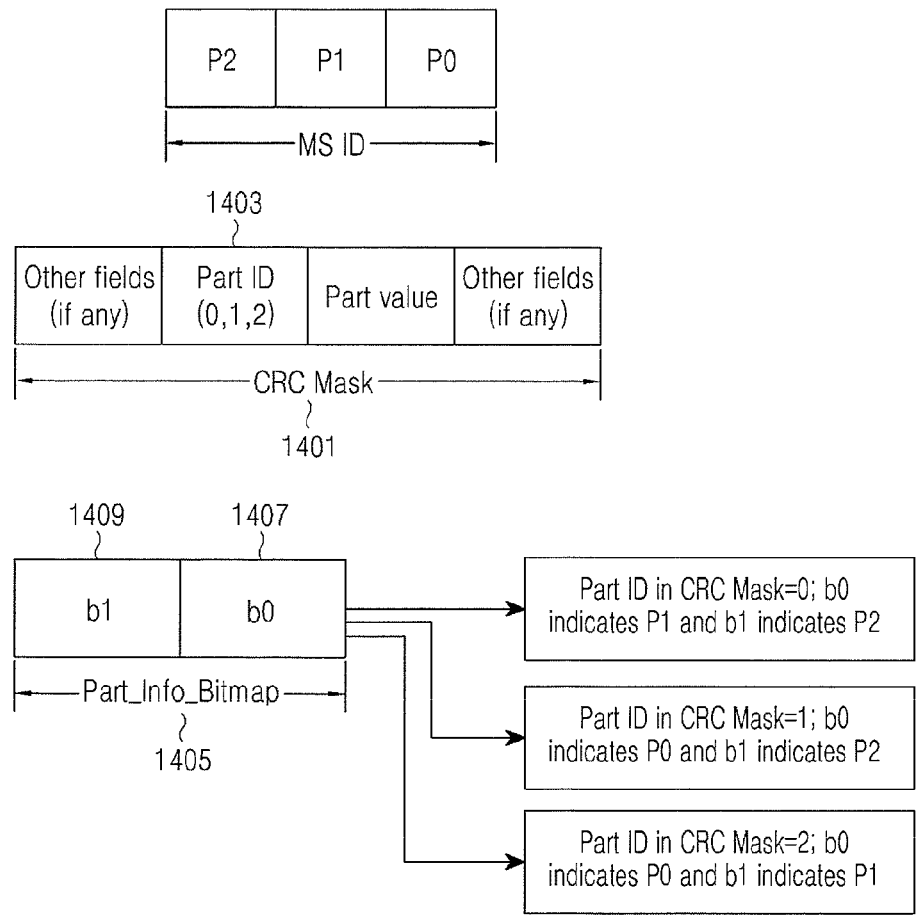
FIG. 14 illustrates one way of MS ID part information encoding, according to embodiments as disclosed herein.

FIG. 14 illustrates one way of MS ID part information encoding, according to embodiments as disclosed herein. As depicted in the figure, in one embodiment the encoding of MS ID part information in the unicast control message for a case wherein MS ID is divided into three parts P0, P1 and P2. One part is encoded in the CRC mask 1401 and is identified using the Part ID 1403 in the CRC mask 1401. The remaining parts are indicated using a part_info_bitmap 1405 which is included inside the control message. The bits 1407, 1409 in the part_info_bitmap 1405 dynamically maps to a different part depending on the part included in the CRC mask 1401. For example if the Part ID 1403 in CRC mask 1401 indicates P0 then bits b0 1407 and b1 1409 in part_info_bitmap 1405 indicates parts P1 and P2 respectively. If the Part ID 1403 in CRC mask 1401 indicates P1 then bits b0 1407 and b1 1409 in part_info_bitmap 1405 indicates parts P0 and P2 respectively. If the Part ID 1403 in CRC mask 1401 indicates P2 then bits b0 1407 and b1 1409 in part_info_bitmap 1405 indicates parts P0 and P1 respectively.

Figure 15:
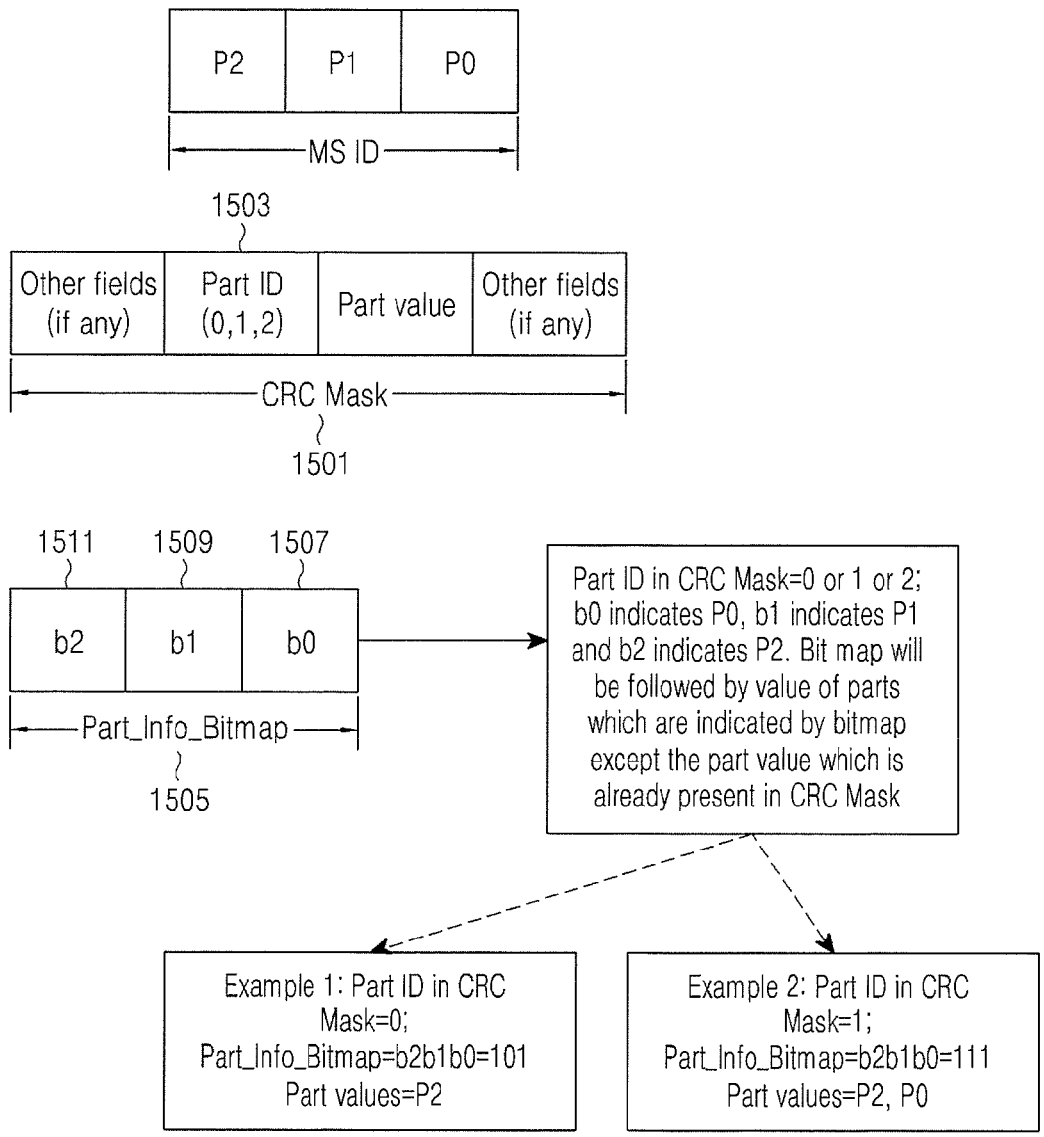
FIG. 15 illustrates another way of MS ID part information encoding, according to embodiments as disclosed herein.

FIG. 15 illustrates another way of MS ID part information encoding, according to embodiments as disclosed herein. As depicted in the figure, the encoding of MS ID part information in the control message for a case wherein MS ID is divided into three parts P0, P1 and P2. One part is encoded in the CRC mask 1501 used for unicast control message and is identified using the Part ID 1503 in the CRC mask 1501. The remaining parts are indicated using a part_info_bitmap 1505 which is included inside the control message. The bits

1507, 1509, 1511 in the part_info_bitmap 1505 maps to a specific part and indicates the parts used.

Figure 16:
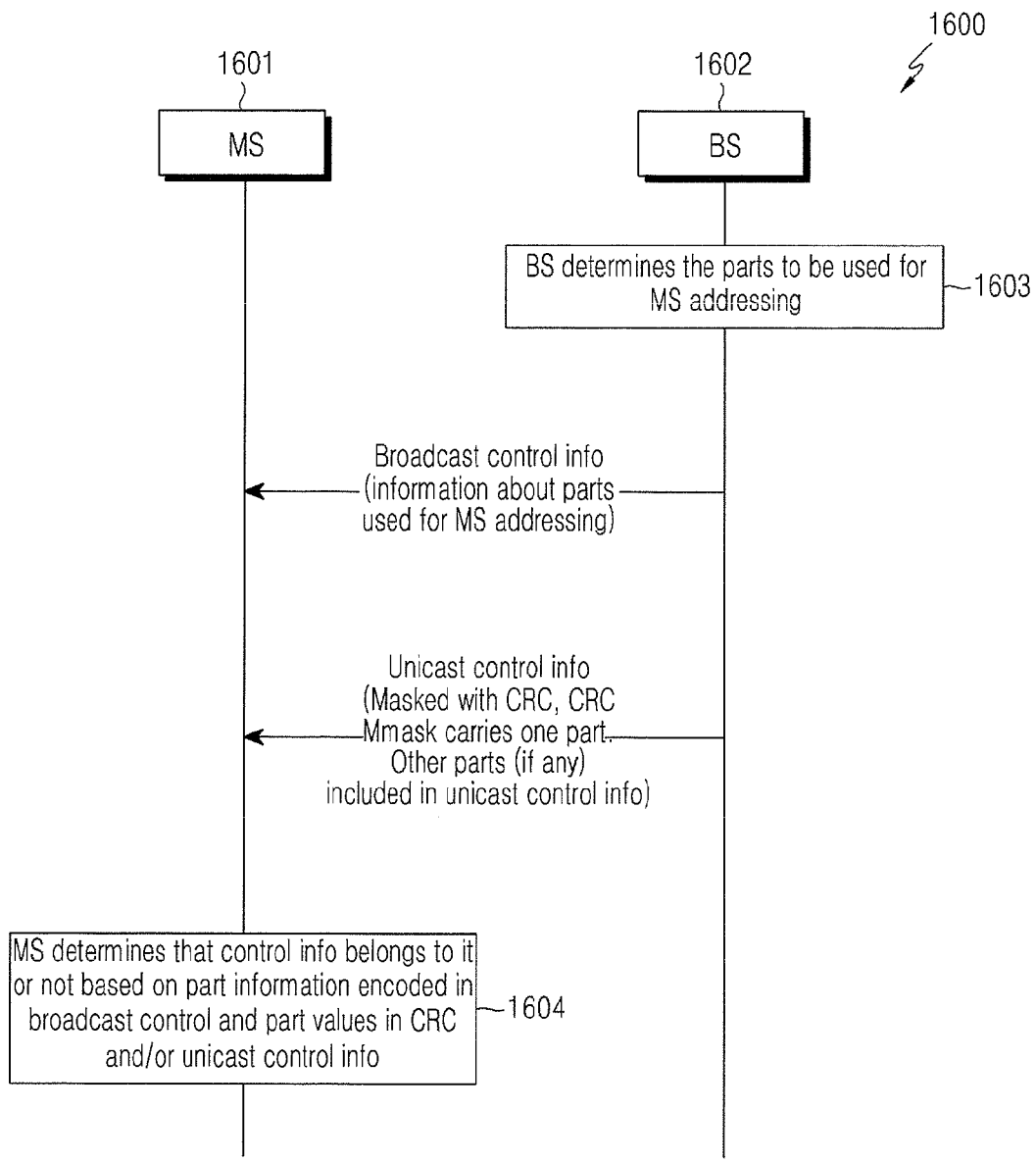
FIG. 16 illustrates the message sequences where the MS ID part information is included in the control information and wherein the MS ID part(s) determined for each MS is same, according to embodiments as disclosed herein.

FIG. 16 illustrates the message sequences where the MS ID part information is included in the control information and wherein the MS ID part(s) determined for each MS is same, according to embodiments as disclosed herein. As depicted in the FIG. 1600, the BS 1602 determines 1603 the parts to be used for MS 1601 addressing. The MS ID parts used for addressing are included in the control message and information about which parts are used for addressing is broadcasted. The BS 1602 sends unicast control info wherein the CRC Mask includes one part. Other parts (if any) are included in the unicast control information. MS 1601 determines 1604 that control info belongs to it or not based on part information encoded in broadcast control and part values in CRC and/or unicast control info. The various actions in method 1600 can be performed in the order presented, in a different order or simultaneously. Further, in some embodiments, some actions listed in FIG. 16 can be omitted.

Figure 17:
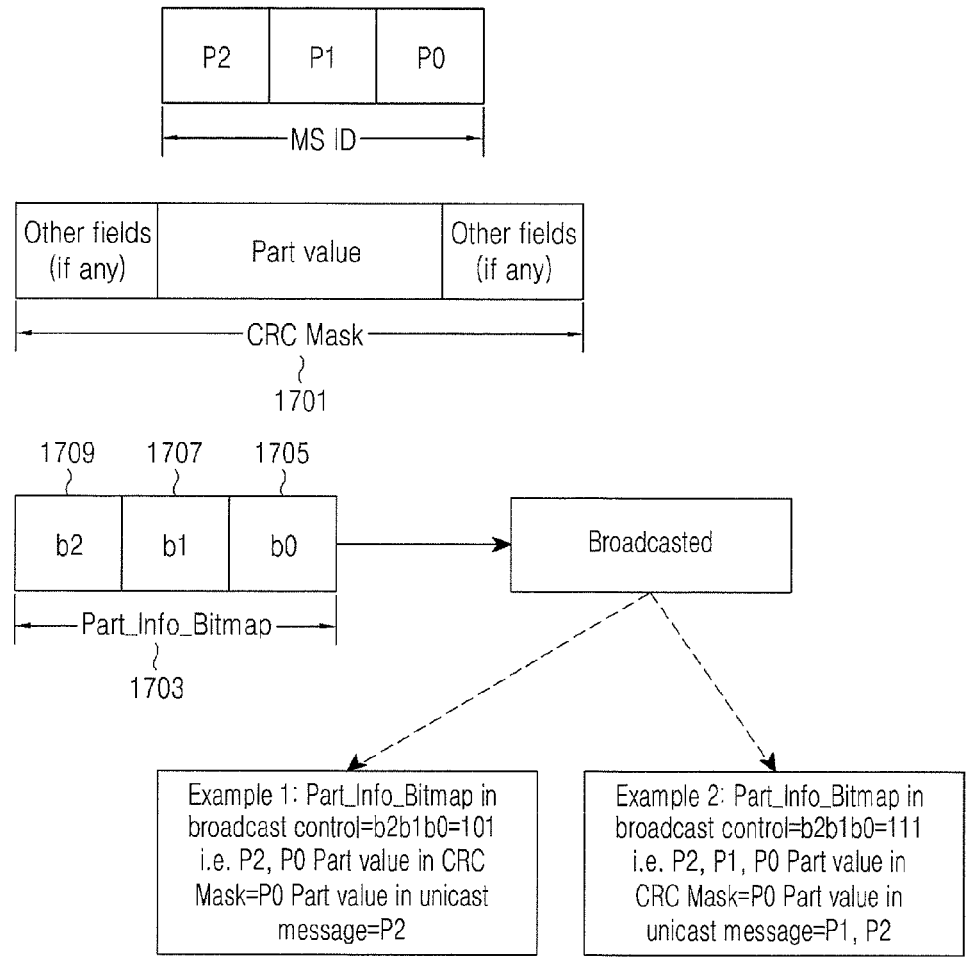
FIG. 17 illustrates an alternate way of MS ID part information encoding, according to embodiments as disclosed herein.

FIG. 17 illustrates an alternate way of MS ID part information encoding, according to embodiments as disclosed herein. As depicted in the figure, the encoding of MS ID part information is done such that the part information is broadcasted and the part values are included in the unicast control message for a case wherein MS ID is divided into three parts P0, P1 and P2. One part is encoded in the CRC mask 1701 used for unicast control message and other parts (if any) are included inside the unicast control message. Part information is broadcasted using the part_info_bitmap 1703. The bits 1705, 1707, 1709 in the part_info_bitmap 1703 corresponds to a specific part and indicates the parts used. In an alternate embodiment, if the CRC length permits multiple parts can also be used to generate CRC mask and remaining parts (if any) can be present in the control message. The parts whose value is used in CRC mask is indicated in broadcast control info.

Figure 18:
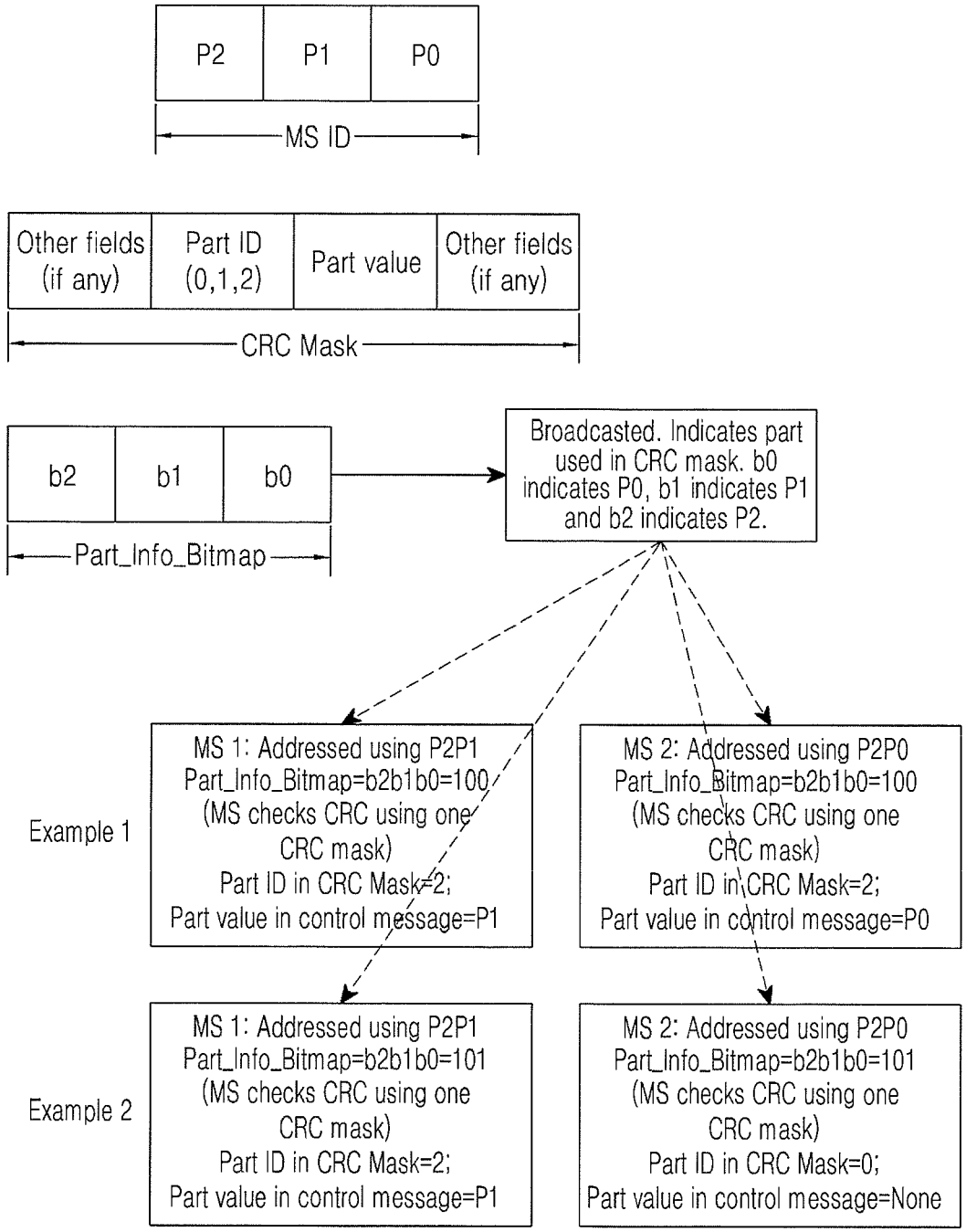
FIG. 18 illustrates another way of MS ID part information encoding, according to embodiments as disclosed herein.

FIG. 18 illustrates another way of MS ID part information encoding, according to embodiments as disclosed herein. In one embodiment, the part or parts used in the CRC mask can be indicated using the broadcast control. This reduces the number of CRC masks which MS has to use to validate CRC. In this case, part identifier can or cannot be there in the CRC mask. BS can identify the common part between the parts used for addressing MSs which are being sent using unicast control info in the interval in which broadcast control information is transmitted and indicate the same in broadcast control info and also use in CRC mask. For example, for an MS ID with three parts P0, P1 and P2, the broadcast control info can indicate that part P1 is used in CRC mask. It can also indicate that the part P1 or P2 is used in CRC mask, which means that MS will check for CRC using CRC mask corresponding to both P1 and P2. It can also indicate that part P1 and P2 is used in CRC mask. This is useful when CRC mask is generated using multiple parts.

Figure 19:
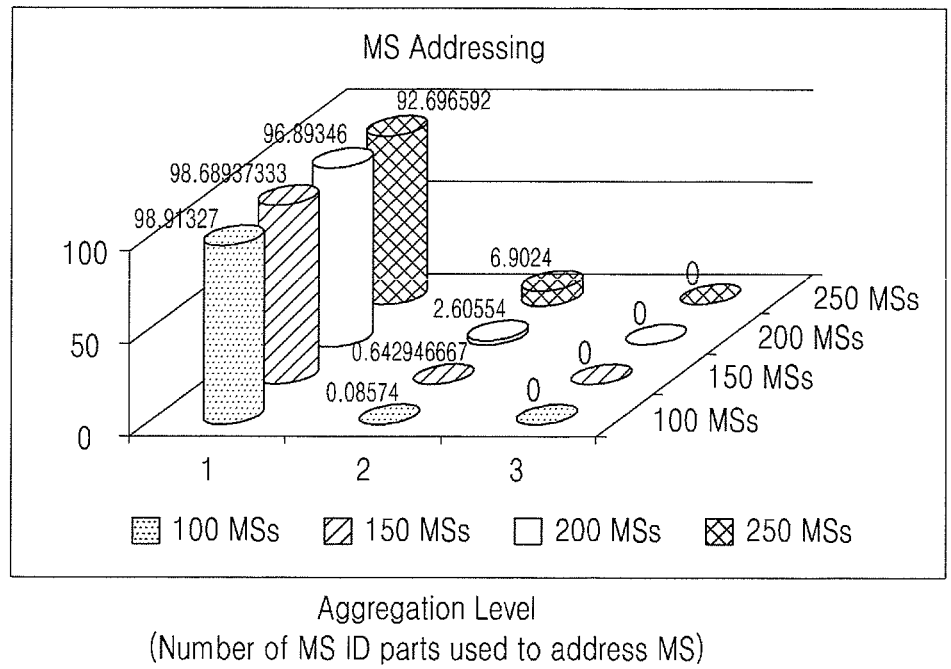
FIG. 19 illustrates the simulation result of MS addressing, according to embodiments as disclosed herein.

FIG. 19 illustrates the simulation result of MS addressing, according to embodiments as disclosed herein. As depicted in the figure, the 24 bit MS ID is partitioned in three parts. 'n' numbers of 24 bit MS IDs are randomly selected from 24 bit MS ID space. The number of parts needed for each of 'n' 24 bit MS ID for addressing is then determined based on proposed method. The random selection and determination of parts for a given value of 'n' is repeated 100000 times and an average value of number of MSs addressed using one part or two parts or three parts is determined. Based on simulation it is found that for a 24 bit MS ID partitioned in three parts and randomly selecting 100 MS IDs, 98.91% of MSs could be distinguished using only one part and remaining by two parts of MS ID. Similarly for 150 MS IDs, 98.68% of MS could be distinguished using only one part and remaining by two parts of MS ID. For 200 MS IDs, 96.9% of MS could be distinguished using only one part and remaining by two parts of MS ID. For 250 MS IDs, 92.69% of MS could be distinguished using only one part and remaining by two parts of MS ID. This means that even if large size MS ID is used to address the MS, signaling overhead using the scheme in the proposed disclosure is very low.

Figure 20:
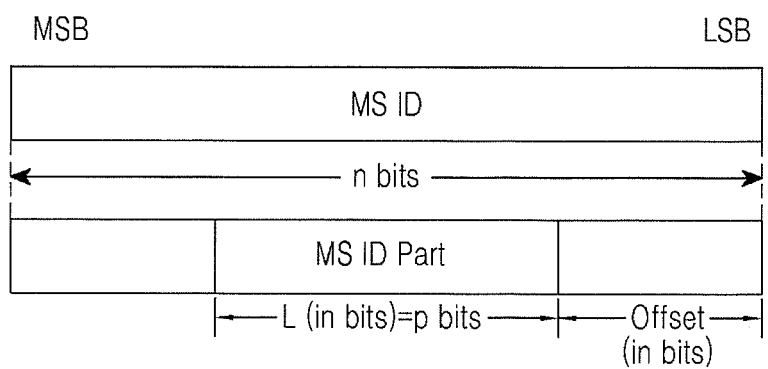
FIG. 20 illustrates the MS ID parts, according to embodiments as disclosed herein.

FIG. 20 illustrates the MS ID parts, according to embodiments as disclosed herein. In one embodiment, an efficient method of signaling the large size MS address (MS ID) is proposed. The MS is addressed using a part of 'n' bit MS ID wherein the part starts at an offset (in bits) from LSB and is of length L bits. By setting different value of offset and/or length bits various parts can be generated from the 'n' bit MS ID. The choice of offset values and length bit depends on the acceptable complexity.

Figure 21:
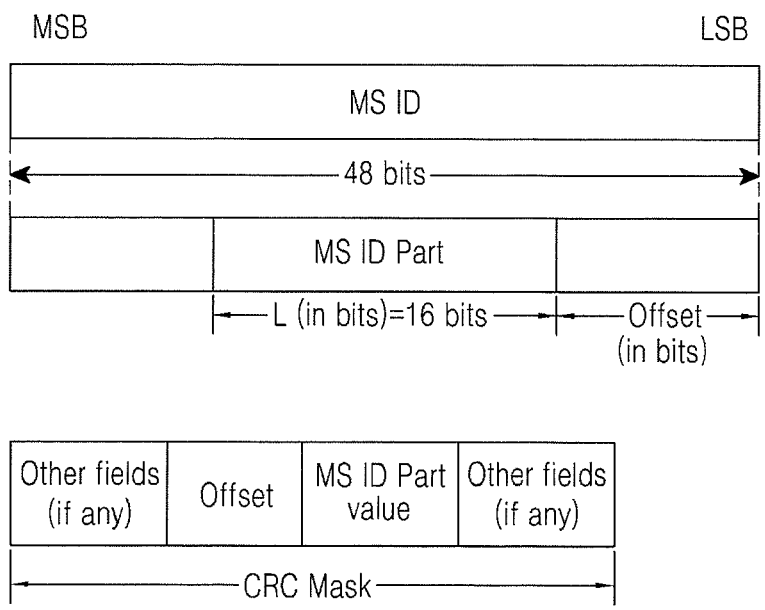
FIG. 21 illustrates one way of MS ID part information encoding, according to embodiments as disclosed herein.

FIG. 21 illustrates one way of MS ID part information encoding, according to embodiments as disclosed herein. The MS ID partitioning scheme in earlier embodiment for a 48 bit MS ID corresponds to offset value of 0, 16 and 32 for length L of 16 bits and offset value of 0, 16 and 32 for length L of 32 bits.

The method of identifying which part is suitable for an MS is same as in earlier embodiment. In order to signal the part used for addressing the MS, offset and/or length of the part needs to be encoded in the signaling carrying the MS ID part. If the length of part to be used is fixed in system then only offset needs to be communicated. The size of offset depends on the granularity of offset and the maximum offset.

For example, when a 48 bit MS ID is considered. The length of MS ID part to be used for reducing the overhead is fixed and is of size L=16 bits. In an embodiment, wherein CRC of control message is masked with MS address, the MS ID part is used to generate the CRC mask. The information about the offset used to identify the MS ID part is also used to generate the CRC mask.

Figure 22:
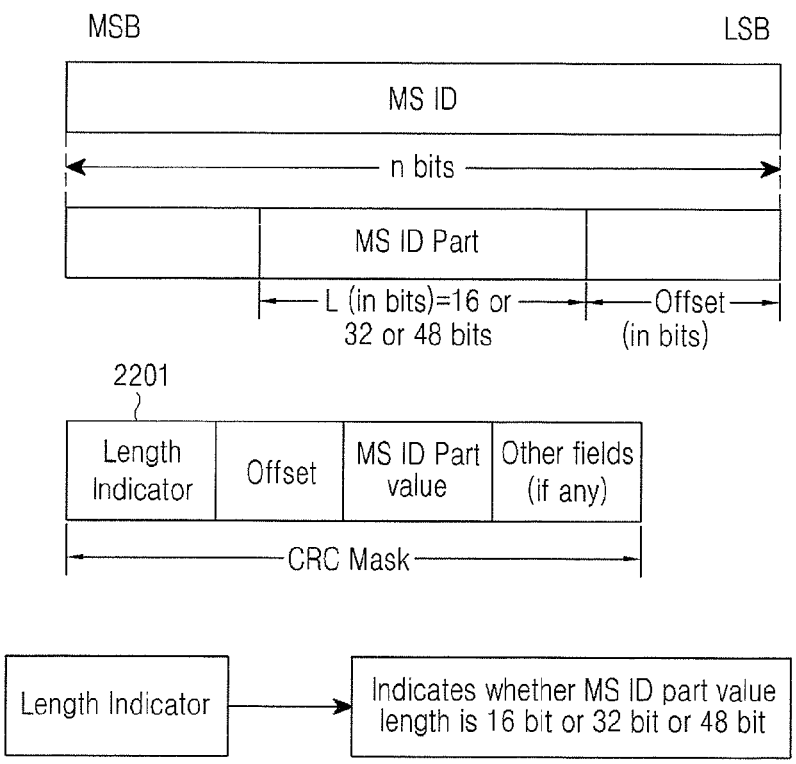
FIG. 22 illustrates alternate way of MS ID part information encoding, according to embodiments as disclosed herein.
Figure 22:
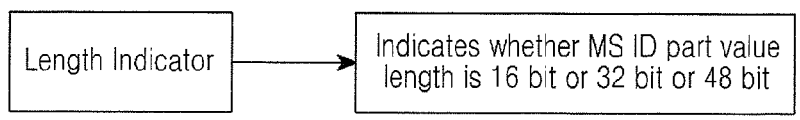

FIG. 22 illustrates alternate way of MS ID part information encoding, according to embodiments as disclosed herein. In one embodiment, the size of MS ID part is variable and size is larger than the number of bits that can be accommodated in CRC mask, least significant bits are used to generate to CRC masked and remaining bits are added inside the control message. The size of MS ID part is indicated using the length indicator. The length indicator can be present in the CRC mask or inside the control message. Length indicator indicates whether MS ID part value length is 16 bit or 32 bit or 48 bit.

Figure 23:
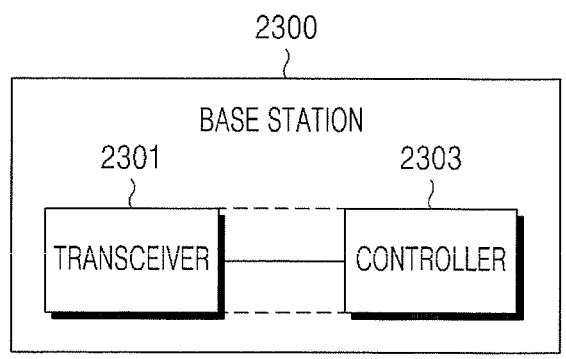
FIG. 23 illustrates a base station apparatus according to an exemplary embodiment of the present disclosure.

FIG. 23 is illustrating a base station apparatus according to an exemplary embodiment of the present disclosure. Referring to FIG. 23, the base station includes transceiving unit 2301 for transceiving signal to/from an MS, and controller 2303. The controller 2303 performs MS addressing operations of the base station according to an exemplary embodiment of the present disclosure. Even though each of the transceiving unit 2301 and the controller 2303, respectively, of the base station is illustrated as a separate module, both of the modules may be implemented in one module, which is equipped in the base station.

Figure 24:
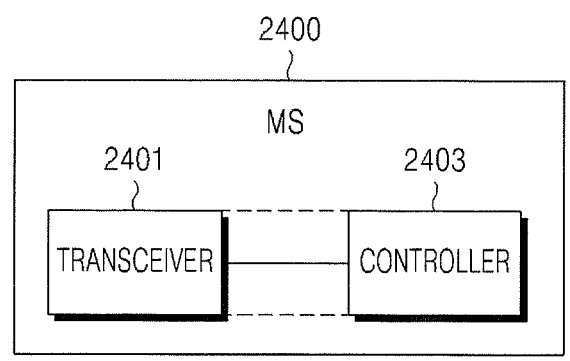
FIG. 24 illustrates an MS apparatus according to an exemplary embodiment of the present disclosure.

FIG. 24 is illustrating an MS apparatus according to an exemplary embodiment of the present disclosure. Referring to FIG. 24, the MS includes transceiving unit 2401 for transceiving signal to/from a base station, and controller 2403. The controller 2403 performs MS addressing operations of the MS according to an exemplary embodiment of the present disclosure. Even though each of the transceiving unit 2401 and the controller 2403, respectively, of the MS is illustrated as a separate module, both of the modules may be implemented in one module, which is equipped in the MS.

The embodiments disclosed herein can be implemented through at least one software program running on at least one hardware device and performing network management functions to control the elements. The elements shown in FIG. 1 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for addressing a mobile station by a base station in a communication network, the method comprising:
    identifying a combination of at least two parts that is unique across mobile station identifications (MS IDs) of other mobile stations, among a plurality of parts being partitioned from an MS ID of the mobile station;
    indicating the combination of the at least two parts to the mobile station; and
    addressing the mobile station based on the combination of the at least two parts,
    wherein the at least two parts are combined until the combined part is unique across the MS IDs of the other mobile stations if each of the plurality of parts is not unique across the MS IDs of the other mobile stations, and
    wherein the combination of the at least two parts is multiple times larger than a size of a part.

2. The method as in claim 1, further comprising partitioning the MS ID of the mobile station into a first part and a second part,
    wherein the first part starts from a least significant bit (LSB) or a most significant bit (MSB) of the MS ID and the second part starts after a last bit of the first part.

3. The method of claim 1, wherein each of the plurality of parts has a same length.

4. The method as in claim 1, further comprising addressing the mobile station based on the MS ID of the mobile station if the combination of the at least two parts is not unique across the MS IDs of the other mobile stations.

5. The method as in claim 1, wherein the indicating comprises:
    encoding information related to at least one part among the plurality of parts into a control information message; and
    transmitting the control information message to the mobile station.

6. The method as in claim 5, wherein the information related to the at least one part is broadcasted to a plurality of mobile stations, if the plurality of mobile stations are addressed using a part among the plurality of parts.

7. The method as in claim 1, further comprising defining a collision threshold for the plurality of parts,
    wherein the collision threshold indicates a number of overlaps allowed for the plurality of parts.

8. The method as in claim 1, wherein the MS ID is partitioned into the plurality of parts based on a plurality of values, and
    wherein the plurality of values are defined for at least one of a length of each of the plurality of parts and an offset for the mobile station.

9. The method as in claim 1, wherein the indicating comprises:
    transmitting an indication of at least one part among the plurality of parts based on a control information message,
    wherein the control information message comprises at least one of a part identifier field, a plurality of part value fields, and a field for a part information bitmap.

10. The method as in claim 9, wherein at least one of a part value field, the part identifier field, and the field for the part information bitmap is encoded in a cyclic redundancy check (CRC) mask for generating a CRC code for the control information message.

11. The method as in claim 1, wherein the indicating comprises:
    transmitting an indication of at least one part among the plurality of parts based on a control information message,
    wherein the control information message comprises at least one of an offset field, a part value field, and a part length indicator field.

12. The method as in claim 11, wherein at least one of the offset field, the part value field, and the part length indicator field is encoded in a cyclic redundancy check (CRC) mask for generating a CRC code for the control information message.

13. A base station for addressing a mobile station in a communication network, the base station comprising:
    a controller configured to: identify a combination of at least two parts that is unique across mobile station identifications (MS IDs) of other mobile stations, among a plurality of parts being partitioned from an MS ID of the mobile station; and
    address the mobile station based on the combination of the at least two parts; and
    a transceiver configured to indicate the combination of the at least two parts to the mobile station,
    wherein the at least two parts are combined until the combined part is unique across the MS IDs of the other mobile stations if each of the plurality of parts is not unique across the MS IDs of the other mobile stations, and
    wherein the combination of the at least two parts is multiple times larger than a size of a part.

14. The base station as in claim 13, wherein the controller is further configured to partition the MS ID of the mobile station into a first part and a second part, and wherein the first part starts from a least significant bit (LSB) or a most significant bit (MSB) of the MS ID and the second part starts after the last bit of the first part.

15. The base station as in claim 13, wherein the controller is further configured to address the mobile station based on the MS ID of the mobile station if the combination of the at least two parts is not unique across the MS IDs of the other mobile stations.

16. The base station as in claim 13, wherein the transceiver is further configured to:
encode information related to at least one part among the plurality of parts in a control information message; and
transmit the control information message to the mobile station.

17. The base station as in claim 13, wherein the controller is further configured to define a collision threshold for the plurality of parts, and
wherein the collision threshold indicates a number of overlaps allowed for the plurality of parts.

18. The base station as in claim 13, wherein the controller is further configured to define a plurality of values, and partition the MS ID into the plurality of parts based on a plurality of values, and
wherein the plurality of values are defined for at least one of a length of each of the plurality of parts and an offset for the mobile station.

19. The base station as in claim 13, wherein the transceiver is further configured to transmit an indication of at least one part among the plurality of parts used for addressing the mobile station based on a control information message, and
wherein the control information message comprises at least one of an offset field, a part value field, and a part length indicator field.

20. The base station as in claim 19, wherein at least one of the offset field, the part value field, and the part length indicator field is encoded in a cyclic redundancy check (CRC) mask for generating a CRC code for the control information message.

21. The base station as in claim 13, wherein the transceiver is further configured to transmit an indication of at least one part among the plurality of parts based on a control information message, and
wherein the control information message comprises at least one of a part identifier field, a plurality of part value fields, and a field for a part information bitmap.

22. The base station as in claim 21, wherein at least one of a part value field, the part identifier field, and the field for the part information bitmap is encoded in a cyclic redundancy check (CRC) mask for generating a CRC code for the control information message.

23. A mobile station employing a mobile station identification (MS ID) in a communication network for addressing the mobile station, the mobile station comprising:
a transceiver configured to receive a control information message from a base station; and
a controller configured to:
decode the control information message, and
identify a combination of at least two parts that is unique across MS IDs of other mobile stations, among a plurality of parts being partitioned from the MS ID of the mobile station based on the decoded control information message,
wherein the at least two parts are combined until the combined part is unique across the MS IDs of the other mobile stations if each of the plurality of parts is not unique across the MS IDs of the other mobile stations, and
wherein the combination of the at least two parts is multiple times larger than a size of a part.

24. The mobile station as in claim 23, wherein the controller is further configured to determine if the control information message is addressed by checking for at least one of part information and a part value included in the control information message.

25. The mobile station as in claim 23, wherein the transceiver is further configured to receive information related at least one part broadcasted to a plurality of mobile stations, if the plurality of mobile stations are addressed using a part among the plurality of parts.

26. A method for employing a mobile station identification (MS ID) by a mobile station in a communication network for addressing the mobile station, the method comprising:
receiving a control information message from a base station;
decoding the control information message; and
identifying a combination of at least two parts being unique across MS IDs of other mobile stations among a plurality of parts being partitioned from the MS ID of the mobile station based on the decoded control information message,
wherein the at least two parts are combined until the combined part is unique across the MS IDs of the other mobile stations if each of the plurality of parts is not unique across the MS IDs of the other mobile stations, and
wherein the combination of the at least two parts is multiple times larger than a size of a part.

27. The method as in claim 26, further comprising determining if the control information message is addressed by checking for at least one of part information and a part value included in the control information message.

28. The method as in claim 26, further comprising receiving the information related to at least one part broadcasted to a plurality of mobile stations, if the plurality of mobile stations are addressed using a part among the plurality of parts.

* * * * *